US008013093B2

(12) United States Patent
Datta et al.

(10) Patent No.: US 8,013,093 B2
(45) Date of Patent: *Sep. 6, 2011

(54) ARTICLES COMPRISING PROPYLENE-BASED ELASTOMERS

(75) Inventors: Sudhin Datta, Houston, TX (US); Chia Yung Cheng, Seabrook, TX (US); Srivatsan Srinivas, Pearland, TX (US); Abdelhadi Sahnoune, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 152 days.

This patent is subject to a terminal disclaimer.

(21) Appl. No.: 10/987,670

(22) Filed: Nov. 12, 2004

(65) Prior Publication Data
US 2005/0107529 A1 May 19, 2005

Related U.S. Application Data

(60) Provisional application No. 60/519,975, filed on Nov. 14, 2003.

(51) Int. Cl.
C08F 210/16 (2006.01)
C08F 236/00 (2006.01)
C08F 236/20 (2006.01)

(52) U.S. Cl. ........ 526/339; 526/335; 526/281; 526/280; 525/331.7; 525/387; 442/398

(58) Field of Classification Search ............... 525/333.8, 525/333.7, 331.7; 526/348, 339, 336, 280, 526/349, 281, 335; 428/500, 527; 442/333, 442/399, 398
See application file for complete search history.

(56) References Cited

U.S. PATENT DOCUMENTS

| | | |
|---|---|---|
| 2,972,600 A | 2/1961 | Braidwood |
| 3,248,179 A | 4/1966 | Norwood |
| 3,287,440 A | 11/1966 | Giller |
| 3,806,558 A | 4/1974 | Fischer |
| 4,311,628 A | 1/1982 | Abdou-Sabet et al. ...... 260/33.6 AQ |
| 4,368,565 A | 1/1983 | Schwarz |
| 4,540,753 A | 9/1985 | Cozewith et al. |
| 4,543,399 A | 9/1985 | Jenkins, III et al. |
| 4,588,790 A | 5/1986 | Jenkins, III et al. |
| 4,603,158 A | 7/1986 | Markham et al. |
| 4,613,484 A | 9/1986 | Ayres et al. |
| 4,820,142 A | 4/1989 | Balk |
| 5,001,205 A | 3/1991 | Hoel |
| 5,028,670 A | 7/1991 | Chinh et al. |
| 5,108,820 A | 4/1992 | Kaneko et al. |
| 5,198,401 A | 3/1993 | Turner et al. |
| 5,229,478 A | 7/1993 | Floyd et al. ............ 526/160 |
| 5,290,886 A | 3/1994 | Ellul ................ 524/515 |
| 5,317,036 A | 5/1994 | Brady, III et al. |
| 5,324,576 A * | 6/1994 | Reed et al. ............. 442/329 |
| 5,336,552 A | 8/1994 | Strack et al. |
| 5,352,749 A | 10/1994 | DeChellis et al. |
| 5,382,400 A | 1/1995 | Pike et al. |
| 5,391,629 A | 2/1995 | Turner et al. |
| 5,397,832 A | 3/1995 | Ellul |
| 5,405,922 A | 4/1995 | DeChellis et al. |
| 5,436,304 A | 7/1995 | Griffin et al. |
| 5,453,471 A | 9/1995 | Bernier et al. |
| 5,462,999 A | 10/1995 | Griffin et al. |
| 5,504,172 A | 4/1996 | Imuta et al. |
| 5,525,675 A | 6/1996 | Masuda et al. |
| 5,543,438 A | 8/1996 | Shibayama et al. |
| 5,616,661 A | 4/1997 | Eisinger et al. |
| 5,627,242 A | 5/1997 | Jacobsen et al. |
| 5,656,693 A | 8/1997 | Ellul et al. ............ 525/171 |
| 5,665,818 A | 9/1997 | Tilston et al. |
| 5,668,228 A | 9/1997 | Chinh et al. |
| 5,677,375 A | 10/1997 | Rifi et al. |
| 5,693,727 A | 12/1997 | Good et al. |
| 5,712,352 A | 1/1998 | Brant et al. |
| 5,936,028 A | 8/1999 | Medsker et al. |
| 6,162,872 A | 12/2000 | Berta |
| 6,207,756 B1 | 3/2001 | Datta et al. ............ 525/191 |
| 6,245,856 B1 | 6/2001 | Kaufman et al. .......... 525/240 |
| 6,265,493 B1 | 7/2001 | Chung et al. ............ 525/247 |
| 6,319,998 B1 | 11/2001 | Cozewith et al. .......... 526/65 |
| 6,329,477 B1 | 12/2001 | Harrington et al. ......... 526/65 |
| 6,342,565 B1 * | 1/2002 | Cheng et al. ............ 525/191 |
| 6,388,016 B1 | 5/2002 | Abdou-Sabet et al. ....... 525/194 |
| 6,525,157 B2 | 2/2003 | Cozewith et al. .......... 526/348 |
| 6,852,424 B2 | 2/2005 | Dharmarajan et al. |
| 6,881,800 B2 | 4/2005 | Friedersdorf |
| 6,960,635 B2 | 11/2005 | Stevens et al. |
| 7,193,024 B2 | 3/2007 | Arriola et al. |

(Continued)

FOREIGN PATENT DOCUMENTS

EP 946640 10/1966

(Continued)

OTHER PUBLICATIONS

JP 8-113657 (May 1996) abstract and translation in English.* U.S. Appl. No. 10/988,161, filed Nov. 12, 2004, entitled "Propylene-Based Elastomers and Uses Thereof", Datta et al.
U.S. Appl. No. 10/987,794, filed Nov. 12, 2004, entitled "Transparent and Translucent Crosslinked Propylene-Based Elastomers, and Their Production and Use", Datta et al.
U.S. Appl. No. 10/988,162, filed Nov. 12, 2004, entitled "High Strength Propylene-Based Elastomers and Uses Thereof", Datta et al.
ASTM International Designation: D 1003-00, "Standard Test Method for Haze and Luminous Transmittance of Transparent Plastics[1]," Jun. 2006, pp. 1-6.

(Continued)

*Primary Examiner* — Rip A. Lee

(57) ABSTRACT

The present invention is directed generally to the use of propylene-based elastomers in articles. The propylene-based elastomers have isotactic polypropylene crystallinity, a melting point by DSC of 110° C. or less, a heat of fusion of from 5 to 50 J/g, and comprise at least 75 wt % propylene-derived units, at least 6 wt % ethylene-derived units, and optionally diene-derived units. The present invention is also directed to processes for making articles comprising propylene-based elastomers.

14 Claims, No Drawings

U.S. PATENT DOCUMENTS

| | | | |
|---|---|---|---|
| 2001/0008695 A1 | 7/2001 | Bolton et al. | |
| 2001/0047069 A1 | 11/2001 | Chung et al. | 526/336 |
| 2003/0236352 A1 | 12/2003 | Winowiecki | |
| 2004/0241360 A1 | 12/2004 | Giblin et al. | |
| 2005/0107529 A1 | 5/2005 | Datta et al. | |
| 2005/0107534 A1 | 5/2005 | Datta et al. | |
| 2005/0131142 A1 | 6/2005 | Datta et al. | |
| 2005/0234172 A1 | 10/2005 | Musgrave et al. | |
| 2007/0021561 A1 | 1/2007 | Tse et al. | |

FOREIGN PATENT DOCUMENTS

| | | |
|---|---|---|
| EP | 0 374 695 | 6/1990 |
| EP | 0 401 993 | 12/1990 |
| EP | 401 993 A2 * | 12/1990 |
| EP | 0 634 421 | 1/1995 |
| EP | 0 794 200 | 9/1997 |
| EP | 0 802 202 | 10/1997 |
| EP | 0 844 278 | 5/1998 |
| EP | 964641 | 7/1998 |
| EP | 0 893 245 | 1/1999 |
| EP | 1003814 | 5/2000 |
| EP | 1 223 191 | 7/2002 |
| GB | 1238419 | 7/1971 |
| JP | S52-034150 | 3/1977 |
| JP | S52-037953 | 3/1977 |
| JP | H08-092337 | 4/1996 |
| JP | 8-113657 * | 5/1996 |
| SU | 660982 | 5/1979 |
| WO | WO 96/08520 | 3/1996 |
| WO | WO 96/33227 | 10/1996 |
| WO | WO 97/22639 | 6/1997 |
| WO | WO 98/27155 | 6/1998 |
| WO | WO 99/45046 | 9/1999 |
| WO | WO00/69963 | 11/2000 |
| WO | WO00/69964 | 11/2000 |
| WO | WO02/34795 | 5/2002 |
| WO | WO 02/051928 A2 * | 7/2002 |
| WO | WO02051928 | 7/2002 |
| WO | WO 02/083754 | 10/2002 |
| WO | WO 02/102863 | 12/2002 |
| WO | WO 03/025036 | 3/2003 |
| WO | WO 03/025037 | 3/2003 |
| WO | WO 03/025038 | 3/2003 |
| WO | WO 03/025084 | 3/2003 |
| WO | WO 03/040065 | 5/2003 |

OTHER PUBLICATIONS

U.S. Appl. No. 10/987,670 USPTO Office Action dated Oct. 18, 2006.
U.S. Appl. No. 10/987,670 USPTO Office Action dated Feb. 7, 2007.
U.S. Appl. No. 10/987,670 USPTO Office Action dated Aug. 14, 2007.
U.S. Appl. No. 10/987,670 USPTO Office Action dated Jan. 30, 2008.
U.S. Appl. No. 10/987,670 USPTO Office Action dated Nov. 10, 2008.
U.S. Appl. No. 10/987,794 USPTO Office Action dated Oct. 26, 2005.
U.S. Appl. No. 10/987,794 USPTO Office Action dated Feb. 8, 2006.
U.S. Appl. No. 10/987,794 USPTO Office Action dated Aug. 31, 2006.
U.S. Appl. No. 10/987,794 USPTO Advisory Action dated Nov. 15, 2006.
U.S. Appl. No. 10/987,794 USPTO Office Action dated Mar. 5, 2007.
U.S. Appl. No. 10/987,794 USPTO Office Action dated Oct. 11, 2007.
U.S. Appl. No. 10/987,794 USPTO Advisory Action dated Dec. 21, 2007.
U.S. Appl. No. 10/987,794 USPTO Office Action dated Feb. 14, 2008.
U.S. Appl. No. 10/987,794 USPTO Office Action dated Aug. 18, 2008.
U.S. Appl. No. 10/987,794 USPTO Advisory Action dated Dec. 3, 2008.
U.S. Appl. No. 10/987,794 USPTO Office Action dated Feb. 27, 2009.
U.S. Appl. No. 10/988,162 USPTO Office Action dated Oct. 23, 2006.
U.S. Appl. No. 10/988,162 USPTO Office Action dated Feb. 7, 2007.
U.S. Appl. No. 10/988,162 USPTO Office Action dated Aug. 14, 2007.
U.S. Appl. No. 10/988,162 USPTO Office Action dated Jan. 14, 2008.
U.S. Appl. No. 10/988,162 USPTO Office Action dated Aug. 13, 2008.
SU 660982 (Abasov et al.) May 5, 1979(abstract). [online] [retrieved on Jan. 7, 2008, East Version: 2.0.3.0]. Retrieved from Derwent Information Ltd. Derwent Accession No. 1980-04871C.
L. M. Wheeler et al., "Gel Permeation Chromatography/Fourier Transform Infrared Interface for Polymer Analysis," Applied Spectroscopy, vol. 47, No. 8 (1993), pp. 1128-1130.
H. N. Cheng, "$^{13}$C NMR Analysis of Ethylene-Propylene Rubbers," *Macromolecules*, vol. 17 (1984), pp. 1950-1955.
Slade, P. E. Ed., "Gel Permeation Chromatography," Polymer Molecular Weights Part II, Marcel Dekker, Inc., NY (1975), pp. 287-368.
Rodriguez, F., Principles of Polymer Systems $3^{rd}$ Ed., Hemisphere Pub. Corp. NY (1989), pp. 155-160.
Ver Strate et al., "Near Monodisperse Ethylene —Propylene Copolymers by Direct Ziegler-Natta Polymerization. Preparation, Characterization, Properties," *Macromolecules*, vol. 21, Issue 12 (1988), pp. 3360-3371.
Hydrocarbon Resins, Kirk-Othmer, Encyclopedia of Chemical Technology, $4^{th}$ Ed., V. 13, pp. 717-743 (J. Wiley & Sons, 1995).
W. Hoffman, "3 *Synthetic Rubber*", Rubber Technology Handbook, Hanser Publisher, Munich, 1988, pp. 42-52.

* cited by examiner

ARTICLES COMPRISING PROPYLENE-BASED ELASTOMERS

This application claims the benefit of U.S. Provisional Application No. 60/519,975, filed Nov. 14, 2003, the entire disclosure of which is hereby incorporated herein by reference.

FIELD OF THE INVENTION

The present invention is directed generally to the use of propylene-based elastomers for making articles, such as films and fabrics. The propylene-based elastomers have an isotactic propylene triad tacticity of from 65 to 95%, a melting point by DSC of 110° C. or less, a heat of fusion of from 5 to 50 J/g, and comprise at least 75 wt % propylene-derived units, at least 6 wt % ethylene-derived units, and optionally diene-derived units. Embodiments of the present invention also include processes for making articles comprising propylene-based elastomers.

BACKGROUND

Materials with good stretchability and elasticity are needed to manufacture a variety of disposal and durable articles, such as incontinence pads, disposable diapers, training pants, clothing, undergarments, sports apparel, automotive trim, weather-stripping, gaskets, and furniture upholstery. Stretchability and elasticity are performance attributes which can, for example, function to effectuate a closely conforming fit to the body of the wearer or to the frame of the item. While numerous materials are known to exhibit excellent stress-strain properties and elasticity at room temperatures, it is often desirable for elastic materials to provide a conforming or secure fit during repeated use, during extensions and retractions at elevated or depressed temperatures, or in automobile interiors during summer months. Elasticity at elevated temperatures is also important for maintaining tight tolerances throughout temperature cycles. In particular, elastic materials used for repeated wear clothing or garments must maintain their integrity and elastic performance after laundering.

Lycra®, a segmented polyurethane elastic material, is currently used in various durable fabrics. Similar to conventional uncrosslinked polyolefin-based elastic materials, articles made from Lycra® can lose their integrity, shape, and elastic properties when subjected to elevated temperatures. Thus, Lycra® is not suitable in many co-knitting applications with high temperature fibers, such as polyester fibers. Also, Lycra® tends to be cost prohibitive for many applications.

Propylene-based polymers having good elastic properties are known. See, for example, U.S. Pat. No. 6,525,157, the entire disclosure of which is hereby incorporated herein by reference. Use of such propylene-based polymers in fiber applications has been contemplated. For example, U.S. Pat. No. 6,342,565, the entire disclosure of which is hereby incorporated herein by reference, discloses a soft, set-resistant, annealed fiber comprising a blend of polyolefins. The blend has a flexural modulus less than or equal to 12,000 psi in/in and includes from 75 to 98 wt % of a first polymer component and from 2 to 25 wt % of a second polymer component. The first polymer component is a propylene-ethylene polymer having at least 80 wt % propylene and up to 20 wt % ethylene, a melting point by DSC in the range of from 25 to 70° C., and a heat of fusion less than 25 J/g. The second polymer component is a stereoregular isotactic polypropylene having a melting point by DSC of greater than 130° C., and a heat of fusion greater than 120 J/g. The fiber exhibits a resistance to set equal to or less than 80% from a 400% tensile deformation. The polyolefin blend is said to be substantially non-crosslinked.

SUMMARY OF THE INVENTION

It has been surprisingly found that propylene-based elastomers can be used to prepare novel articles, such as films and fabrics, that are capable of retaining desirable elasticity characteristics after dyeing and/or heat-setting processes that are typically conducted at elevated temperatures, such as 130° C. and higher. Such articles are particularly useful for durable fabric applications. In a particular aspect of this embodiment, articles, such as films or fabrics, can be made from fibers comprising the propylene-based elastomers described herein in combination with fibers which require heat setting at elevated temperatures, such as PET fibers.

In one embodiment, the invention provides an article, such as a film or fabric, comprising at least 60 wt %, based on the total polymeric weight of the article, of a crosslinked elastomer having an isotactic triad tacticity of from 65 to 95%, a melting point by DSC equal to or less than 110° C., a heat of fusion of from 5 to 50 J/g, and comprising at least 75 wt % propylene-derived units, at least 6 wt % ethylene-derived units, and optionally diene-derived units.

In another embodiment, the invention provides a process for making an article, the process comprising extruding a composition comprising a propylene-based elastomer as described herein, forming an article from the extruded composition, and exposing the formed article to a chemical curative to crosslink the article.

DETAILED DESCRIPTION

As used herein, the term "launderable" refers to the ability of an elastic polymer composition in the form of a fiber to pass the high temperature heat setting and dyeing tests described herein.

As used herein, the term "elastic" refers to any material, such as bands, ribbons, strips, tapes, profile, moldings, sheets, coatings, films, threads, filament, fibers, fibrous webs, fabrics, and the like, as well as laminates and composites thereof, having a tension set of 80% or less, or 60% or less, or 50% or less, or 25% or less, at 200% elongation at a temperature between its glass transition temperature and its crystalline melting point. Elastic polymer materials and compositions are also referred to in the art as "elastomers" and "elastomeric."

The articles of the present invention are made from at least 60 wt % of a propylene-based elastomer described below which has been fabricated into an article having a thickness of 0.5 in or less, or 0.3 in or less, or 0.2 in or less, or 0.1 in or less, or 0.1 in or less, or 0.08 in or less, or 0.05 in or less, or 0.02 in or less, or 0.01 in or less, or 0.008 in or less, or 0.005 in or less. The length and width of the article are not limited by the present invention. Such articles include, for example, fibers, nonwoven and woven fabrics, sheets, films, and composites thereof. In a particular aspect of the invention, the article is a film or fabric comprising at least 60 wt % of a propylene-based elastomer described below, wherein the film or fabric has an MFR@230° C. of ≦1.

Fibers

As used herein, the term "multicomponent" refers to fibers which have been formed from at least two polymers extruded for separate extruders and meltblown or spun together to form one fiber. Multicomponent fibers are also referred to in the art as bicomponent fibers. The polymers used in multicomponent fibers are typically different from each other, however, conjugated fibers can be monocomponent fibers. The polymers are arranged in substantially constantly positioned distinct zones across the cross-section of the conjugated fibers and extend continuously along the length of the conjugated fibers. The configuration of conjugated fibers can be, for example, a sheath/core arrangement wherein one polymer is surrounded by another, a side by side arrangement, a pie arrangement or an "islands-in-the-sea" arrangement. Conjugated fibers are described in U.S. Pat. Nos. 5,108,820; 5,336,552; and 5,382,400; the entire disclosures of which are hereby incorporated herein by reference. In a particular embodiment, the fibers of the present invention can be part of a conjugated configuration.

Fibers can be in the form of, for example, continuous filament yarn, partially oriented yarn, and staple fibers. Continuous filament yarns typically range from 40 denier to 20,000 denier (denier=number of grams per 9000 yards). Filaments currently range from 1 to 20 or more denier per filament (dpf). Spinning speeds are typically 800 m/min to 1500 m/min (2500 ft/min to 5000 ft/min).

Partially oriented yarn (POY) is the fiber produced directly from fiber spinning without solid state drawing, as in the continuous filament. The orientation of the molecules in the fiber is done in the melt state just after the molten polymer leaves the spinneret.

Staple fiber filaments can range, for example, from 1.5 dpf to 70 dpf or more, depending on the application. There are two basic staple fiber fabrication processes: traditional and compact spinning. The traditional process typically involves two steps: 1) producing, applying, finishing, and winding, followed by 2) drawing, a secondary finish application, crimping, and cutting into the staple.

Fabrics

The formation of nonwoven fabrics from polyolefins and their blends generally requires the manufacture of fibers by extrusion followed by weaving or bonding. The extrusion process is typically accompanied by mechanical or aerodynamic drawing of the fibers. The elastic fabrics of the present invention may be manufactured by conventional equipment using any technique known in the art. Such methods and equipment are well known. For example, spunbond nonwoven fabrics may be produced by spunbond nonwoven production lines produced by Reifenhauser GmbH & Co., Troisdorf, Germany. The Reifenhauser system utilizes a slot drawing technique as described in U.S. Pat. No. 4,820,142.

The term "nonwoven" is used herein in the conventional sense to mean a web or fabric having a structure of individual fibers or threads which are randomly interlaid, but not in an identifiable manner as is the case for a knitted fabric. The elastic fiber of the present invention can be employed to prepare inventive nonwoven elastic fabrics as well as composite structures comprising the elastic nonwoven fabric in combination with nonelastic materials.

As used herein, the term "thermal bonding" refers to the heating of fibers to effect the melting (or softening) and fusing of fibers such that a nonwoven fabric is produced. Thermal bonding includes calendar bonding and through-air bonding, as well as other methods known in the art.

The nonwovens of the present invention include melt blown fabrics and spunbonded fabrics. Melt blown fabrics are generally webs of fine filaments having a fiber diameter in the range of from 20 to 0.1 microns. Typical fiber diameters are in the range of from 1 to 10 microns, or from 1 to 5 microns. The nonwoven webs formed by these fine fiber diameters have very small pore sizes and can, therefore, have excellent barrier properties. For example, in the melt blown process, the extruder melts the polymer and delivers it to a metering melt pump. The melt pump delivers the molten polymer at a steady output rate to the special melt blowing die. As the molten polymer exits the die, they are contacted by high temperature, high velocity air (called process or primary air). This air rapidly draws and, in combination with the quench air, solidifies the filaments. The fabric is formed by blowing the filaments directly onto a porous forming belt.

Spunbonded fibers are generally produced, for example, by the extrusion of molten polymer from either a large spinneret having several thousand holes or with banks of smaller spinnerets, for example, containing as few as 40 holes. After exiting the spinneret, the molten fibers are quenched by a cross-flow air quench system, then pulled away from the spinneret and attenuated (drawn) by high speed air. Filaments formed in this manner are collected on a screen ("wire") or porous forming belt to form the web. The web is then passed through compression rolls and then between heated calender rolls where the raised lands on one roll bond the web at points covering 10% to 40% of its area to form a nonwoven fabric.

In some embodiments, the fabrics of the present invention are further processed. In a particular aspect of this embodiment, the fabric is subjected to a surface treatment, such as sizing. Thus, in some embodiments, the fabric may contain sizing additives such as rosins, resins, or waxes. In another particular aspect of this embodiment, the fabric is subjected to a tentering process. In another particular aspect of this embodiment, blocking agents are added to the fabric in a processing step subsequent to the formation of the fabric.

Films

Films of the present invention may be manufactured by conventional tubular extrusion (blown bubble process) or by cast extrusion. In the cast extrusion process, the molten resin is extruded from an elongate die to the form of a web. The web is cast onto a chill roller, which solidifies the polymer, and finally the web is wound into a roll. The process described above may also include a set of embossing rolls to chill and form the film.

Films of the present invention can be made with a coextruded soft or thermoplastic layer adhered to one or both sides of the inventive film. The layers are adhered by a process of coextrusion of the film with the layer. In these coextruded films the individual layers are different in composition and retain their composition except at the interface layer. These layers may be either a soft material such as an ethylene-propylene copolymer elastomer which is intended to reduce the adhesive sticky feel of the inventive film, or a thermoplastic. In one embodiment, the thermoplastic layer is used as a mechanical support for the elastic film to prevent sag. In another embodiment, the thermoplastic layer is used as a barrier to adhesion of the polymer film to other surfaces. In another embodiment, the thermoplastic layer becomes a part of the integral use of the elastic film in that the composite film is stretched beyond the yield point of the thermoplastic layer (typically>50% elongation) and allowed to retract due to the elastic forces of the elastic core film. In this operation thermoplastic film is wrinkled to lead to a desirable surface finish of the composite elastic film. In a particular aspect of this embodiment, the thermoplastic is selected from polypropylene and polyethylene.

The mechanical properties referred to above can be enhanced by the mechanical orientation of the polymer film. Mechanical orientation can be done by the temporary, forced extension of the polymer film along one or more axis for a short period of time before it is allowed to relax in the absence of the extensional forces. It is believed that the mechanical orientation of the polymer leads to reorientation of the crystallizable portions of the blend of the first and the second polymer.

Cured Products

In one embodiment, articles of the present invention are at least partially cured so that the article becomes heat-resistant. As used herein, the term "heat-resistant" refers to the ability of a polymer composition or an article formed from a polymer composition to pass the high temperature heat-setting and dyeing tests described herein.

As used herein, the terms "cured," "crosslinked," "at least partially cured," and "at least partially crosslinked" refer to a composition having at least 2 wt % insolubles based on the total weight of the composition and/or a composition having a viscosity ratio of from 1 to 10.

In some embodiments, the degree of curing is measured by the wt % of insolubles in any solvent that dissolves the composition prior to curing. The compositions described herein may be cured to a degree so as to provide at least 2 wt %, or at least 5 wt %, or at least 10 wt %, or at least 20 wt %, or at least 35 wt %, or at least 45 wt %, or at least 65 wt %, or at least 75 wt %, or at least 85 wt %, or less than 95 wt % insolubles.

In some embodiments, the degree of curing is measured by the viscosity ratio. The compositions described herein may be cured to a degree so as to provide a viscosity ratio of from 1 to 10, or from 1.2 to 10.

The crosslinking can be carried out on-line (that is, during fabrication of the article), off-line (such as after fabrication of the article) or on-spool (as such in the case of fibers, filaments and the like). In a particular embodiment, the crosslinking is effected by radiation. In a particular aspect of this embodiment, irradiation is carried out after shaping or fabrication of the article. In another particular aspect of this embodiment, the crosslinking agent is applied to the article after fabrication. Examples of crosslinking agents which can be applied after fabrication of the article, include, but are not limited to electron-beam irradiation, beta irradiation, X-rays, gamma irradiation, controlled thermal heating, corona irradiation.

In another embodiment, crosslinking is effected by the use of peroxides and other free radical generating agents, sulfur compounds, phenolic resins, silicon hydrides and hydrosilation procedures. In a particular aspect of this embodiment, the crosslinking agent is either a fluid or is converted to a fluid such that it can be applied uniformly to the article. Fluid crosslinking agents include those compounds which are gases (e.g., sulfur dichloride), liquids (e.g., Trigonox C, available from Akzo Nobel), solutions (e.g., dicumyl peroxide in acetone, or suspensions thereof (e.g., a suspension or emulsion of dicumyl peroxide in water).

In a particular embodiment, the composition or article made therefrom is crosslinked using peroxides, free radical generating agents, or electron-beam irradiation. Examples of peroxides include, but are not limited to dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate. Free radical generating agents include, but are not limited to azo compounds. Peroxide and free radical generating curing systems are usually accompanied by the addition of coagents which may enhance the effectiveness of the crosslinking. Examples of such coagents include, but are not limited to polyfunctional vinyl or allyl compounds such as, for example, triallyl cyanurate, triallyl isocyanurate, pentaerthritol tetramethacrylate, glutaraldehyde, ethylene glycol dimethacrylate, diallyl maleate, dipropargyl maleate, dipropargyl monoallyl cyanurate, azobis isobutyl nitrite and the like, and combinations thereof.

In another particular embodiment, the crosslinking is carried out under an inert or oxygen-limited atmosphere. Suitable atmospheres can be provided by the use of helium, argon, nitrogen, carbon dioxide, xenon and/or a vacuum.

Crosslinking either by chemical agents or by irradiation can be promoted with a crosslinking catalyst, such as organic bases, carboxylic acids, and organometallic compounds including organic titanates and complexes or carboxylates of lead, cobalt, iron, nickel, zinc, and tin (such as dibutyltindilaurate, dioctyltinmaleate, dibutyltindiacetate, dibutyltindioctoate, stannous acetate, stannous octoate, lead naphthenate, zinc caprylate, cobalt naphthenate, and the like).

Irradiation crosslinking can be conducted with gamma rays, electron beam, UV rays or other sufficiently high energy radiation. Suitable electron-beam irradiation equipment is available from Energy Services, Inc., of Wilmington, Mass. with capabilities of at least 100 kilo-electron volts (KeV) and at least 5 kilowatts (Kw). In a particular embodiment, electrons are employed in up to 70 megarads dosages. The irradiation source can be any electron beam generator operating in a range of about 150 Kev to about 12 mega-electron volts (MeV) with a power output capable of supplying the desired dosage. The electron voltage can be adjusted to appropriate levels which may be, for example, 100,000; 300,000; 1,000,000; 2,000,000; 3,000,000; 6,000,000. A wide range of apparatus for irradiating polymers and polymeric articles is available.

In the present invention, effective irradiation is generally carried out at a dosage between about 1 megarads (Mrad) to about 35 megarads, preferably from about 2 to about 35 megarads, or from about 3 to about 32 megarads, or from about 4 to about 28 megarads. In a particular aspect of this embodiment, the irradiation is carried out at room temperature.

In some embodiments, the fiber, the non-woven fabric or the film comprises a diene-containing propylene-based elastomer. The presence of the diene in the propylene-based elastomer facilitates curing of the fabric or film and may optimize end use performance. In other embodiments, such as when using radiation to induce curing, the presence of diene in the propylene-based elastomer is optional.

In another embodiment, the article of the present invention is dyed. In a particular aspect of this embodiment, the article is dyed prior to crosslinking. In another particular aspect of this embodiment, the article is dyed after crosslinking.

Propylene-Based Elastomer

The propylene-based elastomer of the present invention is a random propylene homopolymer or copolymer having crystalline regions interrupted by non-crystalline regions. The non-crystalline regions may result from regions of non-crystallizable polypropylene segments and/or the inclusion of comonomer units. The crystallinity and the melting point of the propylene-based elastomer are reduced compared to highly isotactic polypropylene by the introduction of errors in the insertion of propylene and/or by the presence of comonomer.

The crystallinity of the propylene-based elastomer may be expressed in terms of heat of fusion. In particular embodiments, the propylene-based elastomer has a heat of fusion, as determined by DSC, ranging from a lower limit of 1.0 J/g, or 1.5 J/g, or 3.0 J/g, or 4.0 J/g, or 6.0 J/g, or 7.0 J/g, to an upper limit of 30 J/g, or 40 J/g, or 50 J/g, or 60 J/g, or 75 J/g.

The crystallinity of the propylene-based elastomer can also be expressed in terms of crystallinity percent. The thermal energy for the highest order of polypropylene is estimated at 189 J/g. That is, 100% crystallinity is equal to 189 J/g. Therefore, in particular embodiments, the propylene-based elastomer has a propylene crystallinity within the range having an upper limit of 65%, or 40%, or 30%, or 25%, or 20%, and a lower limit of 1%, or 3%, or 5%, or 7%, or 8%.

The level of crystallinity is also reflected in the melting point. The term "melting point," as used herein is the highest peak among principal and secondary melting peaks, as determined by DSC. In particular embodiments, the propylene-based elastomer has a melting point by DSC ranging from an upper limit of 110° C., or 105° C., or 90° C., or 80° C., or 70° C. to a lower limit of 0° C., or 20° C., or 25° C., or 30° C., or 35° C., or 40° C., or 45° C.

The propylene-based elastomer generally comprises at least 60 wt % propylene-derived units, and in particular embodiments, the propylene-based elastomer comprises at least 75 wt %, or at least 80 wt %, or at least 90 wt % propylene-derived units.

Propylene-based elastomers suitable in the present invention have an isotactic propylene triad tacticity within the range having a lower limit of 65%, or 70%, or 75% to an upper limit of 95%, or 97%, or 98%, or 99%. The isotactic propylene triad tacticity of a polymer is the relative tacticity of a sequence of three adjacent propylene units, a chain consisting of head to tail bonds, expressed as a binary combination of m and r sequences. The isotactic propylene triad tacticity of the polymers disclosed herein was determined using $C^{13}$NMR and the calculations outlined in U.S. Pat. No. 5,504,172.

The propylene-based elastomer of the invention has an isotacticity index greater than 0%, or within the range having an upper limit of 50%, or 25% and a lower limit of 3%, or 10%.

The propylene-based elastomer of the invention has a tacticity index (m/r) within the range having an upper limit of 8, or 10, or 12, and a lower limit of 4, or 6.

In some embodiments, the crystallinity of the propylene-based elastomer is reduced by the copolymerization of propylene with limited amounts of one or more comonomers selected from: ethylene, $C_4$-$C_{20}$ alpha-olefins, and polyenes. In these copolymers, the amount of propylene-derived units present in the propylene-based elastomer ranges from an upper limit of 99.9 wt %, or 97 wt %, or 95 wt %, or 94 wt %, or 92 wt %, or 90 wt %, or 85 wt % to a lower limit of 60 wt %, 68 wt %, or 70 wt %, or 71 wt %, or 75 wt %, or 76 wt %, or 80 wt %, based on the total weight of the propylene-based elastomer. The amount of optional units-derived from ethylene and/or $C_4$-$C_{20}$ alpha-olefins present in the propylene-based elastomer ranges from an upper limit of 40 wt %, or 35 wt %, or 30 wt %, or 28 wt %, or 25 wt %, or 20 wt %, or 15 wt % to a lower limit of 0 wt %, or 0.5 wt %, or 1 wt %, or 2 wt %, or 3 wt %, or 5 wt %, or 6 wt %, or 8 wt %, or 10 wt %, based on the total weight of the propylene-based elastomer. The amount of optional polyene-derived units present in the propylene-based elastomer ranges from an upper limit of 25 wt %, or 20 wt %, or 15 wt %, or 10 wt %, or 7 wt %, or 5 wt %, or 4.5 wt %, or 3 wt %, or 2.5 wt %, to a lower limit of 0 wt %, or 0.1 wt %, or 0.2 wt %, or 0.3 wt %, or 0.5 wt %, or 1 wt %, or 1.5 wt % based on the total weight of the propylene-based elastomer.

Non-limiting examples of preferred α-olefin(s) optionally present in the propylene-based elastomer include propylene, 1-butene, 1-pentene, 1-hexene, 1-octene, and 1-dodecene. The polyene-derived units optionally present in the propylene-based elastomer may be derived from any hydrocarbon structure having at least two unsaturated bonds wherein at least one of the unsaturated bonds may be incorporated into a polymer. Non-limiting examples of preferred polyenes include 5-ethylidene-2-norbornene ("ENB"), 5-vinyl-2-norbornene("VNB"), divinyl benzene ("DVB"), and dicyclopentadiene ("DCPD").

In a particular embodiment, the propylene-based elastomer has a Mooney viscosity ML(1+4) at 125° C. of from 0.5 to 100, or from 5 to 40, or from 10 to 40.

In another particular embodiment, the propylene-based elastomer has a MFR@230° C. within a range having a lower limit of 1, or 5, or 10 to an upper limit of 50, or 100, or 150, or 200, or 300.

The propylene-based elastomer of the invention has a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol, and a molecular weight distribution $M_w/M_n$ (MWD), sometimes referred to as a "polydispersity index" (PDI), within the range having an upper limit of 40, or 20, or 10, or 5, or 4.5, or 4.0, or 3.2, or 3.0, and a lower limit of 1.5, or 1.8, or 2.0.

Illustrative non-limiting examples of suitable propylene-based elastomers, as well as the methods for preparing them, include the "FPC" disclosed in pending U.S. Provisional Patent Application No. 60/519,975; the "isotactic propylene copolymer" disclosed in U.S. patent application Publication No. 2003/0204017; the "propylene ethylene copolymers" disclosed in U.S. Pat. No. 6,525,157; and the "propylene ethylene copolymers" disclosed in PCT Publication No. WO02/083754, the disclosures of which are hereby fully incorporated herein by reference.

Separate from, or in combination with the foregoing, the crystallinity of the propylene-based elastomer can be reduced also by stereo-irregular incorporation of the propylene-derived units, which can be influenced by, for example, the choice of catalyst and polymerization temperature.

The propylene-based elastomers of the present invention are not limited by any particular polymerization method of preparation, and the polymerization processes described herein are not limited by any particular type of reaction vessel.

In a particular embodiment, the catalyst system used to produce the propylene-based elastomer includes one or more transition metal compounds and one or more activators. When alumoxane or aluminum alkyl activators are used, the combined pre-catalyst-to-activator molar ratio is generally from 1:5000 to 10:1. When ionizing activators are used, the combined pre-catalyst-to-activator molar ratio is generally from 10:1 to 1:10. Multiple activators may be used, including using mixtures of alumoxanes or aluminum alkyls with ionizing activators.

In another particular embodiment, the catalyst system includes a bis(cyclopentadienyl) metal compound and either (1) a non-coordinating compatible anion activator, or (2) an alumoxane activator. Non-limiting examples of catalyst systems which can be used are described in U.S. Pat. Nos. 5,198,401 and 5,391,629, which are hereby incorporated herein by reference.

In another embodiment, the propylene-based elastomer is made in the presence of an activating cocatalyst which is a precursor ionic compound comprising a halogenated tetra-aryl-substituted Group 13 anion wherein each aryl substituent contains at least two cyclic aromatic rings. In a particular aspect of this embodiment, the propylene-based elastomer contains greater than 0.2 parts per million, or greater than 0.5 parts per million, or greater than 1 part per million, or greater than 5 parts per million of the residues of the activating cocatalyst.

In another particular embodiment, the catalyst system used to produce the propylene-based elastomer includes a Hf-containing metallocene catalyst, such as but not limited to dimethyl silyl bis(indenyl)hafnium dimethyl, and a non-coordinating anion activator, such as but not limited to dimethyl anilinium tetrakis(heptafluoronaphthyl)borate.

In yet another particular embodiment, the propylene-based elastomer is produced using any of the catalyst systems and polymerization methods disclosed in U.S. patent application Publication No. 2004/0024146, the disclosure of which is hereby incorporated herein by reference.

In yet another particular embodiment, the propylene-based elastomer is produced using a catalyst system such as one of the nonmetallocene, metal-centered, heteroaryl ligand catalyst systems described in U.S. patent application Publication No. 2003/0204017, the disclosure of which is hereby incorporated herein by reference.

Further general process condition information suitable for use in preparing the propylene-based elastomer can be found in disclosures including, but not limited to U.S. Pat. No. 5,001,205 and PCT publications WO96/33227 and WO97/22639. Further information on gas phase polymerization processes can be found in disclosures including, but not limited to U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; and 5,677,375, and European publications EP-A-0 794 200; EP-A-0 802 202; and EP-B-634 421. Information relating to methods of introducing liquid catalyst systems into fluidized bed polymerizations into a particle lean zone can be found in disclosures including, but not limited to U.S. Pat. No. 5,693,727. Further information on slurry polymerization processes can be found in disclosures including, but not limited to U.S. Pat. Nos. 3,248,179 and 4,613,484. PCT publication WO 96/08520 and U.S. Pat. No. 5,712,352 are non-limiting examples of disclosures which describe a polymerization process operated in the absence of or essentially free of any scavengers.

Crystalline Polymer Component

Some embodiments of the invention include a crystalline propylene polymer component. The crystalline polymer component may be selected from: propylene homopolymer, propylene copolymer, and mixtures thereof which are commonly known as reactor copolymers or impact copolymers. In embodiments where the crystalline polymer component includes a propylene copolymer, the propylene copolymer may be a graft copolymer, block copolymer, or random copolymer.

The amount of propylene-derived units present in the crystalline polymer component is 90 wt % or higher, or 92 wt % or higher, or 95 wt % or higher, or 97 wt % or higher, or 100 wt %, based on the total weight of the crystalline polymer component.

In one embodiment, the crystalline polymer component includes a random copolymer of propylene and at least one comonomer selected from one or more of: ethylene and $C_4$-$C_{12}$ alpha-olefins. In a particular aspect of this embodiment, the amount of comonomer is within the range having an upper limit of 9 wt %, or 8 wt %, or 6 wt %, and a lower limit of 2 wt %, based on the total weight of the crystalline polymer component.

The crystalline polymer component of the invention has a melting point by DSC of at least 110° C., or at least 115° C., or at least 130° C., and a heat of fusion, as determined by DSC, of at least 60 J/g, or at least 70 J/g, or at least 80 J/g.

The crystalline polymer component of the invention has a weight average molecular weight ($M_w$) within the range having an upper limit of 5,000,000 g/mol, or 500,000 g/mol, and a lower limit of 10,000 g/mol, or 50,000 g/mol, and a molecular weight distribution $M_w/M_n$ (MWD), sometimes referred to as a "polydispersity index" (PDI), within the range having an upper limit of 40 and a lower limit of 1.5.

The invention is not limited by any particular method for preparing the crystalline polymer component. In one embodiment, the crystalline polymer component may be a propylene homopolymer obtained by a well known process for the homopolymerization of propylene in a single stage or multiple stage reactor. In another embodiment, the crystalline polymer component may be a propylene copolymer obtained by a well known process for copolymerizing propylene and one or more comonomers in a single stage or multiple stage reactor.

Polymerization methods for preparing the crystalline polymer component include high pressure, slurry, gas, bulk, solution phase, and combinations thereof. Catalyst systems that can be used include traditional Ziegler-Natta catalysts and single-site metallocene catalyst systems. In one embodiment, the catalyst used has a high isospecificity.

Polymerization of the crystalline polymer component may be carried out by a continuous or batch process and may include the use of chain transfer agents, scavengers, or other such additives well known to those skilled in the art. The crystalline polymer component may also contain additives such as flow improvers, nucleators, and antioxidants which are normally added to isotactic polypropylene to improve or retain properties.

Ethylene-Based Polymer

Some embodiments of the invention include an ethylene-based polymer having no crystallinity or ethylene type crystallinity. The ethylene-based polymer is a copolymer of ethylene, an alpha-olefin, and optionally a diene. The amount of ethylene-derived units in the ethylene-based polymer is 50 mol % or greater. In one embodiment, the ethylene-based polymer is an ethylene-hexene copolymer. In another embodiment the ethylene-based polymer is a polymer of ethylene, propylene, and diene commonly known as EPDM. In a particular aspect of this embodiment, the amount of propylene-derived units in the ethylene-based polymer is 40 mol % or greater.

Blends

In one embodiment, the invention provides an article comprising a blend composition, the blend composition comprising at least one propylene-based elastomer, and at least one additional component selected from a crystalline propylene-based polymer component and an ethylene-based polymer.

Compositions of the present invention which include at least one propylene-based elastomer, at least one crystalline propylene-based polymer, and optionally an ethylene-based polymer, have a heterogeneous phase morphology consisting of domains of different crystallinities. These domains of different crystallinities differentiate the inventive compositions from commonly available propylene reactor copolymers (i.e., blends of isotactic polypropylene and copolymers of propylene and ethylene), which have a single crystalline phase.

The continuous phase of the heterogeneous blend compositions described herein has amorphous or crystallizable morphology, and contains the propylene-based elastomer and optional ethylene-based polymer. The dispersed phase has crystalline morphology, and contains crystalline propylene-based polymer, optional fillers, and may also contain propylene-based elastomer and ethylene-based polymer in small amounts relative to the continuous phase. The propylene-based elastomer has low crystallinity relative to the crystalline propylene-based polymer component; therefore, the continuous phase of the inventive compositions has low crystallinity relative to the dispersed phase. The low crystallinity continuous phase differentiates the inventive compositions from commonly available propylene impact copolymers, thermoplastic elastomers, thermoplastic vulcanizates, and thermoplastic olefins, which have a highly crystalline continuous phase.

The components of the blend compositions are compatible to the extent that it may not be necessary to add preformed or in-situ formed compatibilizer to attain and retain a fine blend morphology.

The domains of the dispersed phase of the heterogeneous blend compositions described herein are small with an average minimum axis of less than 5 µm. The larger axis of the dispersed phase can be as large as 100 µm.

Additives

As will be evident to those skilled in the art, the compositions of the present invention may comprise other additives in addition to the polymer components. Various additives may be present to enhance a specific property or may be present as a result of processing of the individual components. Additives which may be incorporated include, but are not limited to processing oils, fire retardants, antioxidants, plasticizers, pigments, vulcanizing or curative agents, vulcanizing or curative accelerators, cure retarders, processing aids, flame retardants, tackifying resins, flow improvers, and the like. Antiblocking agents, coloring agents, lubricants, mold release agents, nucleating agents, reinforcements, and fillers (including granular, fibrous, or powder-like) may also be employed. Nucleating agents and fillers may improve the rigidity of the article. The list described herein is not intended to be inclusive of all types of additives which may be employed with the present invention. Those of skill in the art will appreciate that other additives may be employed to enhance properties of the composition. As is understood by those skilled in the art, the compositions of the present invention may be modified to adjust the characteristics of the blend as desired.

The compositions described herein may also contain inorganic particulate fillers, which may improve the mechanical and wear properties of the compositions, particularly in compositions including cured components. The amount of inorganic filler used is typically from 1 to 100 parts by weight of inorganic filler per 100 parts of polymer. The inorganic fillers include particles less than 1 mm. in diameter, rods less than 1 cm in length, and plates less than 0.2 $cm^2$ in surface area. Exemplary particulate fillers include carbon black, clays, titanium and magnesium oxides, and silica. In addition, other particulate fillers, such as calcium carbonate, zinc oxide, whiting, and magnesium oxide, can also be used. An example of a rod-like filler is glass fiber. An example of a plate-like filler is mica. The addition of very small particulate fibers, commonly referred to as nanocomposites, is also contemplated. The addition of the fillers may change the properties of the compositions described herein. For example, compositions including inorganic filler may have improved thermal stability and resistance to wear. The addition of white fillers may improve the temperature changes of the hydrocarbon polymers on exposure to sunlight. The addition of fillers beyond a certain level may lead to a dramatic increase in the viscosity and a corresponding decrease in processability. This threshold level is referred to as the percolation threshold. In addition to the increase in viscosity, the percolation threshold is accompanied by an improvement in the elastic properties, and at levels slightly higher than the percolation threshold there is a drop in the elastic recovery of the blend. The percolation threshold is attained at different levels of addition of fillers depending on the type of filler used. Generally, the percolation threshold is attained at lower levels for fillers with a smaller size than for fillers with a larger size.

The compositions described herein may contain process oil in the range of from 0 to 500 parts by weight, or from 2 to 200 parts by weight, or from 5 to 150 parts by weight, or from 10 to 100 parts by weight, per hundred parts of total polymer. The addition of process oil in moderate amounts may lower the viscosity and flexibility of the blend while improving the properties of the blend at temperatures near and below 0° C. It is believed that these potential benefits arise by the lowering of the glass transition temperature (Tg) of the blend. Adding process oil to the blend may also improve processability and provide a better balance of elastic and tensile strength. The process oil is typically known as extender oil in rubber applications. Process oils include hydrocarbons having either (a) traces of hetero atoms such oxygen or (b) at least one hetero atom such as dioctyl plithalate, ethers, and polyethers. Process oils have a boiling point to be substantially involatile at 200° C. These process oils are commonly available either as neat solids, liquids, or as physically absorbed mixtures of these materials on an inert support (e.g., clay, silica) to form a free flowing powder. Process oils usually include a mixture of a large number of chemical compounds which may consist of linear, acyclic but branched, cyclic, and aromatic carbonaceous structures. Another family of process oils are certain organic esters and alkyl ether esters having a molecular weight (Mn) less than 10,000. Combinations of process oils may also be used in the practice of the invention. The process oil should be compatible or miscible with the polymer blend composition in the melt, and may be substantially miscible in the propylene-based elastomer at room temperature. Process oils may be added to the blend compositions by any of the conventional means known in the art, including the addition of all or part of the process oil prior to recovery of the polymer, and addition of all or part of the process oil to the polymer as a part of a compounding for the interblending of the propylene-based elastomer. The compounding step may be carried out in a batch mixer, such as a mill, or an internal mixer, such as a Banbury mixer. The compounding operation may also be conducted in a continuous process, such as a twin screw extruder. The addition of process oils to lower the glass transition temperature of blends of isotactic polypropylene and ethylene propylene diene rubber is described in U.S. Pat. Nos. 5,290,886 and 5,397,832, the disclosures of which are hereby incorporated herein by reference.

The addition of process aids, such as a mixture of fatty acid ester or calcium fatty acid soap bound on a mineral filler, to the compositions described herein may help the mixing of the composition and the injection of the composition into a mold. Other examples of process aids are low molecular weight polyethylene copolymer wax and paraffin wax. The amount of process aid used may be within the range of from 0.5 to 5 phr.

Adding antioxidants to the compositions described herein may improve the long term aging. Examples of antioxidants include, but are not limited to quinolein, e.g., trimethylhydroxyquinolein (TMQ); imidazole, e.g., zincmercapto toluyl imidazole (ZMTI); and conventional antioxidants, such as hindered phenols, lactones, and phosphites. The amount of antioxidants used may be within the range of from 0.001 to 5 phr.

DEFINITIONS AND TEST METHODS

Comonomer content: The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, vol. 47, pp. 1128-1130.

In the particular case of propylene-ethylene copolymers containing greater than 75 wt % propylene, the comonomer content can be measured as follows. A thin homogeneous film is pressed at a temperature of about 150° C. or greater, and mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+30.045X$^2$, where X is the ratio of the peak height at 1155 cm$^{-1}$ and peak height at either 722 cm$^{-1}$ or 732 cm$^{-1}$, whichever is higher.

Polyene content: The amount of polyene present in a polymer can be inferred by the quantitative measure of the amount of the pendant free olefin present in the polymer after polymerization. Several procedures such as iodine number and the determination of the olefin content by H$^1$ or $^{13}$C nuclear magnetic resonance (NMR) have been established. In embodiments described herein where the polyene is ENB, the amount of polyene present in the polymer can be measured using ASTM D3900.

Isotactic: The term "isotactic" is defined herein as a polymer sequence in which greater than 50% of the pairs of pendant methyl groups located on adjacent propylene units, which are inserted into the chain in a regio regular 1,2 fashion and are not part of the backbone structure, are located either above or below the atoms in the backbone chain, when such atoms in the backbone chain are all in one plane. Certain combinations of polymers in blends or polymer sequences within a single polymer are described as having "substantially the same tacticity," which herein means that the two polymers are both isotactic according to the definition above.

Tacticity: The term "tacticity" refers to the stereoregularity of the orientation of the methyl residues from propylene in a polymer. Pairs of methyl residues from contiguous propylene units identically inserted which have the same orientation with respect to the polymer backbone are termed "meso" (m). Those of opposite configuration are termed "racemic" (r). When three adjacent propylene groups have methyl groups with the same orientation, the tacticity of the triad is 'mm'. If two adjacent monomers in a three monomer sequence have the same orientation, and that orientation is different from the relative configuration of the third unit, the tacticity of the triad is 'mr'. When the middle monomer unit has an opposite configuration from either neighbor, the triad has 'rr' tacticity. The fraction of each type of triad in the polymer can be determined and when multiplied by 100 indicates the percentage of that type found in the polymer.

The triad tacticity of the polymers described herein can be determined from a $^{13}$C nuclear magnetic resonance (NMR) spectrum of the polymer as described below and as described in U.S. Pat. No. 5,504,172, the disclosure of which is hereby incorporated herein by reference.

Tacticity Index: The tacticity index, expressed herein as "m/r", is determined by $^{13}$C nuclear magnetic resonance (NMR). The tacticity index m/r is calculated as defined in H. N. Cheng, *Macromolecules*, 17, 1950 (1984). An m/r ratio of 1.0 generally describes a syndiotactic polymer, and an m/r ratio of 2.0 generally describes an atactic material. An isotactic material theoretically may have a ratio approaching infinity, and many by-product atactic polymers have sufficient isotactic content to result in ratios of greater than 50.

Melting point and heat of fusion: the melting point (Tm) and heat of fusion of the polymers described herein can be determined by Differential Scanning Calorimetry (DSC), using the ASTM E-794-95 procedure. About 6 to 10 mg of a sheet of the polymer pressed at approximately 200° C. to 230° C. is removed with a punch die and annealed at room temperature for 48 hours. At the end of this period, the sample is placed in a Differential Scanning Calorimeter (Perkin Elmer Pyris Analysis System and cooled to about −50° C. to −70° C. The sample is heated at about 20° C./min to attain a final temperature of about 180° C. to 200° C. The term "melting point," as used herein, is the highest peak among principal and secondary melting peaks as determined by DSC, discussed above. The thermal output is recorded as the area under the melting peak of the sample, which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting of the sample.

Molecular weight and molecular weight distribution: The molecular weight and molecular weight distribution of the polymers described herein can be measured as follows. Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight Mz/Mw.

Mz, Mw, and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/M$_n$ or Mz/M$_w$) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287-368; Rodriguez, F., *Principles of Polymer Systems 3rd ed.*, Hemisphere Pub. Corp., NY, (1989) 155-160; U.S. Pat. No. 4,540, 753; Verstrate et al., *Macromolecules*, vol. 21, (1988) 3360; and references cited therein.

Tension set: Tension set can be measured according to the general ASTM D790 procedure by uniaxially deforming a sample to different elongations.

Stress relaxation: Stress relaxation can be measured using the following procedure. The sample is mounted on an Instron 4465 tester and elongated to 200% elongation. The load at this elongation is measured as L1. The sample is maintained at this extension for 30 seconds and the new load at the end of the 30 seconds is measured as $L1_{30}$. The relaxation (R1) of the film is measured as $100 \times (L1-L1_{30})/L1$, and is expressed as a percentage. The sample is returned to the initial elongation of 0%. The sample is then elongated to 200% elongation. The load at this elongation is measured as L2. The sample is maintained at this extension for 30 seconds and the new load at the end of the 30 seconds is measured as $L2_{30}$. The relaxation (R2) of the film is measured as $100 \times (L2-L2_{30})/L2$, and is expressed as a percentage. The sample is returned to the initial elongation of 0%. The elongation at which the load on the sample is zero on the second cycle is noted as the set %. The hysteresis in the sample is designated as $100 \times (L1-L2)/L1$, and is expressed as a percentage.

Stress strain measurements: The stress-strain elongation properties of the cured compounds described herein can be measured according to the ASTM D790 procedure described as follows. Dumbbell shaped samples were fabricated into a cured pad molded into dimensions of 6 in×6 in and removed with a die. The stress strain evaluation of the samples was conducted on an Instron 4465 tester determined for blends at 20 in/min, made by Instron Corporation of Canton, Mass. The digital data was collected in a file collected by the Series IX Material Testing System available from Instron Corporation and analyzed using Excel, a spreadsheet program available from Microsoft Corporation of Redmond, Wash.

PHR: The term "phr" is used herein to mean parts per hundred rubber or parts per hundred elastomeric polymer.

Extraction in refluxing xylene: Solubility in refluxing xylene is a measurement of the amount of insoluble and unextractible propylene-based elastomer and optional ethylene-based polymer in compositions containing cured propylene-based elastomer and cured ethylene-based polymer (if present). The process for determining solubility in xylene is as follows. A sample having a thin section, i.e., less than 0.5 in, and weighing approximately 2 grams is weighed, and the weight is recorded as $W_1$. The sample is exposed to 50 ml of refluxing xylene in an extraction apparatus. The temperature of the sample is maintained at or near 140° C. by the refluxing solvent. After 24 hours of extraction, the solvent is decanted off and 50 ml of new solvent is added and the extraction is conducted under identical conditions for another 24 hours. At the end of this period, the sample is removed and dried in a vacuum oven at 100° C. for 24 hours. The sample is then cooled and weighed for a final weight which is recorded as $W_2$. The fraction of the polymer insoluble in xylene at reflux is determined by the following formula: % crosslinked, by extraction=$100 \times [W_2(1-F_{Fi})]/[W_1(1-F_S-F_P-F_{Fi})]$, where $F_S$ is the weight fraction of crystalline polymer component present in the composition, $F_P$ is the weight fraction of plasticizer, process oil, and other low molecular weight materials present in the composition which are extractible in refluxing xylene, and $F_{Fi}$ is the weight fraction of filler and other inorganic material present in the composition which are normally inextractible in refluxing xylene.

Die C tear: Die C tear properties are reported in lb/in according to the ASTM D624 version 00 procedure. The data herein is for peak force and the average of three samples is reported as the average data. The original data may be multiplied by 0.175 to convert the units from lb/in to $kN/m^2$.

Trouser tear: Trouser tear properties are reported in lb/in according to the ASTM D624 version 00 procedure. The data herein is for peak force and the average of three samples is reported as the average data. The original data may be multiplied by 0.175 to convert the units from lb/in to $kN/m^2$.

Mooney viscosity: Mooney viscosity, as used herein, is measured as ML(1+4)@125° C. according to ASTM D1646.

Melt flow rate and melt index The determination of the Melt Flow rate (MFR) and the Melt Index of the polymer is according to ASTM D1238 using modification 1 with a load of 2.16 kg. In this version of the method a portion of the sample extruded during the test was collected and weighed. The sample analysis is conducted at 230° C. with a 1 minute preheat on the sample to provide a steady temperature for the duration of the experiment. This data expressed as dg of sample extruded per minute is indicated as MFR. In an alternative procedure, the test is conducted in an identical fashion except at a temperature of 190 C. This data is referred to as MI@190 C.

Shore A and Shore D hardness The determination of the Shore A and Shore D hardness of the polymer is according to ASTM D 2240. In this version of the method a portion of the sample is tested at room temperature. The data is recorded 15 seconds after the indentation is created in the sample.

Isotacticity Index: The isotacticity index is calculated according to the procedure described in EP 0374695A2. The IR spectra of a thin film of the material is recorded and the absorbance at 997 $cm^{-1}$ and the absorbance at 973 $cm^{-1}$ are determined. The quotient of the absorbance at 997 $cm^{-1}$ to the absorbance at 973 $cm^{-1}$ is multiplied by 100 to yield the isotacticity index. In the determination of the absorbance at these two positions the position of zero absorbance is the absorbance when there is no analytical sample present in the sample beam.

Viscosity ratio: Rheological experiments were performed on the samples before and after irradiation. Experiments were performed on a Rheomterics ARES Rheometer using parallel plate geometry using 25 mm diameter plates. Small amplitude oscillatory shear measurements were performed at 190° C. and 20% strain from 0.1 to 100 rad/s. The ratio of the viscosity of the samples at 0.1 rad/s after radiation to that before radiation is taken to be the viscosity ratio.

EXAMPLES

ESC PP 3155 is an isotactic homopolypropylene available from Exxon Mobil Chemical Co., Houston, Tex.

Sulfur dichoride was used as a solution in dichoromethane and is available from Aldrich Chemical Co, Milwaukee, Wis.

Trigonox C is a peroxide available from Akzo Nobel Chemicals, Chicago, Ill.

The propylene-based elastomers in the following examples can be prepared according to the following procedure. In a 27 liter continuous flow stirred tank reactor equipped with a dual pitch blade turbine agitator, 92 Kg of dry hexane, 34 Kg of propylene, 1.8 Kg of ethylene, 1.1 Kg of 5-ethylidene-2-norbornene (ENB) are added per hour. The reactor is agitated at 650 rpm during the course of the reaction and is maintained liquid full at 1600 psi pressure (gauge) so that all regions in the polymerization zone have the same composition during the entire course of the polymerization. A catalyst solution in toluene of 1.5610-3 grams of dimethylsilylindenyl dimethyl hafnium and 2.4210-3 grams of dimethylanilinium tetrakis (heptafluoronaphthyl) borate are added at a rate of 6.35 ml/min to initiate the polymerization. An additional solution of tri-n-octyl aluminum (TNOA) is added to remove extraneous moisture during the polymerization. The polymerization is conducted at approximately 59° C. and the temperature is maintained during the polymerization by adding pre-chilled hexane at a temperature between −3° C. and 2° C. The polymerization typically leads to the formation of 9.5 Kg of polymer per hour. The polymer is recovered by two stage removal of the solvent, first by removing 70% of the solvent using a lower critical solution process as described in WO0234795A1, and then removing the remaining solvent in a LIST devolatization extruder. The polymer is recovered as pellets of about ⅛ to ¼ inch in principal axes.

Example 1

Four examples were prepared according to the following general procedure. The melt blended resin system containing a propylene-based elastomer ("FPC") and a crystalline polymer component ("SPC") was fed into the fiber spinning extruder. The fiber spinning was carried out in a conventional fiber spinning line under POY (partially oriented yarn) mode. It was equipped with a two inch diameter single screw extruder. The molten polymer from the extruder was fed to a melt pump, which delivers the molten polymer to a spinneret. The spinneret contained 72 capillaries, each with a diameter of 0.6 mm. The molten polymer exiting the spinneret was quenched by cold air at 60° F. and at a speed of 60 ft/min. The quenched fiber was taken up by a mechanical roll (or godet) which can be varied from 0 to 5000 meter/min. To measure the maximum spinning speed of the sample, the output rate was maintained constant at 0.6 gram/hole/min. The speed of the godet was increased gradually, which increases the fiber speed and reduces the fiber diameter. The speed was increased until the fiber break occurred. The speed at which the fiber break occurred was the maximum spinning speed of that sample. The same process is repeated three times and the average reading is recorded.

Example 2

Spunbond fabrics were produced according to the following procedure. The spundbond system uses a 1 meter wide single spunbond beam line manufactured by Reifenhauser GmbH, Troisdorf, Germany. The melt blended or dry blended resin system is fed into the extruder of the spunbond system. The output rate is generally in the range of from 0.2 to 0.3 gram/hole/min, depending on the desired fiber size. The processing conditions are similar to spunbond fabrication using conventional polypropylene.

Six samples were produced. The propylene-based elastomer (FPC) of samples 2-1 and 2-2 is VM2210, a propylene-based elastomer having 15 wt % ethylene, and a MFR@230° C. of 22. VM2210 is commercially available from ExxonMobil Chemical Co., Houston, Tex. In samples 2-3 through 2-12, a polymer blend was prepared, prior to the generation of fibers and fabrics, by melt blending the polymer components in a single screw extruder including pelletization to produce pellets containing a homogeneous blend. The propylene-based elastomers (FPC) of samples 2-3 through 2-12 were produced according to the procedure given above and have a composition as shown in Table 2-1. The crystalline propylene polymer (SPC) of samples 2-3 through 2-12 is ESC PP3155.

The extruder of the spunbond system delivered the homogenized molten polymer to a melt pump, which delivered the molten polymer to the spin beam. The spin beam had approximately a 1 meter wide rectangular spinneret having approximately 4000 holes. Each hole had a diameter of 0.6 mm. The molten polymer thread exiting the spinneret was quenched and drawn down into fine fibers by the cold air. The quenched and highly drawn fiber were deposited on a moving porous web to form a mate of non-woven web. The unbonded web was passed through a calender roll which is heated to approximately 200° F. As the web was passed through the nip of the calender, the fiber was annealed, in a single step, and the elasticity of the fiber was enhanced. The melt temperature was 450° F. and the calender roll pressure was 100 lbs/linear inch.

TABLE 1

| | EXAMPLE | | | |
|---|---|---|---|---|
| | 1 | 2 | 3 | 4 |
| Blend Materials Used | | | | |
| FPC* (wt %) | 80 | 90 | 80 | 90 |
| SPC1** (wt %) | 20 | 10 | 0 | 0 |
| SPC2*** (wt %) | 0 | 0 | 20 | 10 |
| Blend Properties | | | | |
| MFR | 23 | 21 | 35 | 25 |
| Delta H, j/g (2nd melt) | 20 | 10 | 20 | 10 |
| Mw | 141,473 | 144,139 | 125,868 | 128,465 |
| Fiber Spinning Properties | | | | |
| Melt temperature | 450° F. | 450° F. | 450° F. | 450° F. |
| quench air temp. | 60° F. | 60° F. | 60° F. | 60° F. |
| quench air flow rate (ft/min) | 60 | 60 | 60 | 60 |
| Maximum spinning speed (m/min) | 3280 | 4270 | not measured | not measured |

*FPC is a 20 MFR propylene-ethylene copolymer containing 15 wt % ethylene.
**SPC1 is PP3155, a 36 MFR isotactic propylene homopolymer commercially available from ExxonMobil Chemical Company, Houston, TX.
***SPC2 is PP3505G, a 400 MFR propylene homopolymer commercially available from ExxonMobil Chemical Company, Houston, TX.

TABLE 2-1

| | FPC | | | Blend Properties | | |
|---|---|---|---|---|---|---|
| | wt % | wt % | MFR @ | | | |
| EXAMPLE | $C_2$ | ENB | 230° C. | FPC wt % | SPC wt % | MFR |
| 2-1 | 15 | 0 | 22 | n/a | n/a | 22 |
| 2-2 | 15 | 0 | 22 | n/a | n/a | 22 |
| 2-3 | 8.7 | 2.1 | 22.4 | 85 | 15 | 20.5 |
| 2-4 | 8.7 | 2.1 | 22.4 | 85 | 15 | 20.5 |
| 2-5 | 10.1 | 2.1 | 21.2 | 85 | 15 | 18.1 |
| 2-6 | 10.1 | 2.1 | 21.2 | 85 | 15 | 18.1 |
| 2-7 | 15.8 | 2.2 | 23.1 | 85 | 15 | 19.9 |
| 2-8 | 15.8 | 2.2 | 23.1 | 85 | 15 | 19.9 |
| 2-9 | 12.9 | 3.98 | 18.7 | 85 | 15 | 20.5 |
| 2-10 | 12.9 | 3.98 | 18.7 | 85 | 15 | 20.5 |
| 2-11 | 13.6 | 2.2 | 17.8 | 85 | 15 | 18.3 |
| 2-12 | 13.6 | 2.2 | 17.8 | 85 | 15 | 18.3 |

TABLE 2-2

Fabric Machine Conditions

| Example | GHM (grams polymer per hole per minute) | GSM (grams polymer per square meter of fabric) | Extruder (rpm) | Die pressure (psi) | Melt temp (° F.) | Spin pump (rpm) | Quench (blower rpm) | Suction (rpm) |
|---|---|---|---|---|---|---|---|---|
| 2-1 | 0.2 | 113 | 54 | 372 | 463 | 9 | 1567 | 1801 |
| 2-2 | 0.2 | 70 | 52 | 366 | 463 | 9 | 1567 | 1807 |
| 2-3 | 0.2 | 103 | 54 | 375 | 463 | 9 | 1567 | 1804 |
| 2-4 | 0.2 | 63 | 56 | 375 | 463 | 9 | 1568 | 1809 |
| 2-5 | 0.2 | 102 | 54 | 385 | 463 | 9 | 1568 | 1812 |
| 2-6 | 0.2 | 63 | 56 | 385 | 463 | 9 | 1567 | 1807 |
| 2-7 | 0.2 | 117 | 54 | 366 | 462 | 9 | 1567 | 1804 |
| 2-8 | 0.2 | 70 | 54 | 362 | 462 | 9 | 1567 | 1811 |
| 2-9 | 0.2 | 114 | 55 | 388 | 463 | 9 | 1566 | 1812 |
| 2-10 | 0.2 | 71 | 54 | 393 | 463 | 9 | 1567 | 1797 |
| 2-11 | 0.2 | 88 | 54 | 418 | 463 | 9 | 1566 | 1808 |
| 2-12 | 0.2 | 70 | n/a | n/a | n/a | n/a | n/a | n/a |

TABLE 2-3

Nonwoven Fabric Properties

| Example | Fiber diameter (μm) | MD tensile peak load (lb) | MD tensile elongation (%) | CD tensile peak load (lb) | CD tensile elongation (%) | Calender temp (° F.) |
|---|---|---|---|---|---|---|
| 2-1 | 17 | 15.6 | 202 | 9.5 | 251 | 179/168 |
| 2-2 | 18 | 7.5 | 178 | 4.9 | 234 | 179/168 |
| 2-3 | 16 | 26.5 | 120 | 16.2 | 148 | 179/168 |
| 2-4 | 17 | 15.0 | 104 | 9.1 | 126 | 179/168 |
| 2-5 | 17 | 28.1 | 113 | 17.3 | 147 | 179/168 |
| 2-6 | 17 | 13.4 | 100 | 9.1 | 138 | 179/168 |
| 2-7 | 19 | 15.4 | 174 | 8.7 | 210 | 179/168 |
| 2-8 | 18 | 6.6 | 143 | 4.4 | 195 | 179/168 |
| 2-9 | 20 | 17.5 | 152 | 10.1 | 200 | 179/169 |
| 2-10 | 18 | 8.3 | 120 | 5.0 | 176 | 179/169 |
| 2-11 | 19 | 18.5 | 145 | 11.2 | 194 | 179/169 |
| 2-12 | 18 | 9.9 | 136 | 5.4 | 173 | n/a |

Example 3

Crosslinking Fabric with Sulfur Dichloride

The following samples of fabric from example 2 were exposed to sulfur dichloride in vapor form for 60 minutes. The samples were then heated to 100° C. under vacuum to complete the crosslinking and remove unreacted reactants and byproducts. After 3 hours, the samples were removed and weighed. These weights are given in Column 2 of Table 3.

The samples are then extracted with refluxing xylene for 120 minutes. The samples are then extracted with refluxing xylene for 120 minutes. The residue is removed from the extraction and dried at 130° C. in a vacuum oven to yield a residue which has the weight shown in Table 3, Column 3. The amount of the insoluble FPC after xylene extraction is determined by assuming that the all samples are 85% FPC and 15% SPC and that the SPC is not crosslinked and is thus extracted by the xylene regardless of the extent of crosslinking of the FPC. The extent of crosslinking is given in Table 3, Column 4.

TABLE 3

| Example | weight of sample (g) | weight of residue after extraction (g) | insoluble FPC (%) |
|---|---|---|---|
| 2-3 | 8.274 | 2.7588 | 39.2 |
| 2-4 | 7.1967 | 1.4366 | 23.5 |
| 2-5 | 6.695 | 3.4162 | 60.0 |
| 2-6 | 4.5479 | 0.4592 | 11.9 |
| 2-7 | 10.3603 | 7.1386 | 81.1 |
| 2-8 | 5.8073 | 1.1343 | 23.0 |
| 2-9 | 9.5036 | 7.9242 | 98.1 |
| 2-10 | 3.042 | 1.6105 | 62.3 |
| 2-11 | 3.5391 | 1.1469 | 38.1 |
| 2-12 | 3.0616 | 1.0322 | 39.7 |

Example 4

Crosslinking Fabric with Peroxide 6 g of Trigonox C was dissolved in 600 g of hexane at room temperature. Samples of 12 in×12 in fabric from example 2 were saturated with the solution and excess was removed. The wet fabric was air dried and exposed to a temperature of 120° C. for 2 hours in a vacuum oven. At the end of this period the fabric was weighed and the results are shown in Table 4, Column 2. We estimate that each fabric had 0.3 g of the peroxide.

The samples are then extracted with refluxing xylene for 120 minutes. The residue is removed and dried at 130° C. in a vacuum oven to yield a residue which has the weight shown in Table 4, Column 3. Extent of crosslinking is determined by assuming that the all samples are 85% FPC and 15% SPC and that the SPC is not crosslinked and is thus extracted by the xylene regardless of the extent of crosslinking of the FPC. The extent of crosslinking is given in Table 4, Column 4.

TABLE 4

| Example | weight of sample (g) | weight of residue after extraction (g) | insoluble FPC (%) |
|---|---|---|---|
| 2-1 | 9.59 | 1.12 | 13.7 |
| 2-2 | 9.19 | 1.88 | 24.1 |
| 2-3 | 9.42 | 7.78 | 97.2 |
| 2-4 | 6.37 | 5.54 | 102.3 |
| 2-5 | 8.72 | 6.68 | 90.1 |
| 2-6 | 5.20 | 4.28 | 96.8 |
| 2-7 | 9.70 | 8.15 | 98.8 |
| 2-8 | 6.90 | 4.20 | 71.6 |
| 2-9 | 9.53 | 7.82 | 96.5 |
| 2-10 | 5.22 | 4.56 | 102.8 |
| 2-11 | 7.21 | 5.97 | 97.4 |
| 2-12 | 5.27 | 4.1 | 91.5 |

Example 5

Crosslinking Film

A propylene-based elastomer (FPC) containing 13.5 wt % ethylene, 2.1 wt % 5-ethylidene-2-norbornene (ENB), and having an MFR@230° C. of 25 was prepared according to the procedure above and then blended with ESC PP 3155 (SPC) in an internal Banbury mixer operating at about 50 rpm at a temperature of about 180 to 200° C. The ratio of propylene-based elastomer to ESC PP 3155 was 90/10. The mixture was cooled and pelletized, and then cast into a sheet on a 3 zone 6" wide die Killion single screw extruder according to the conditions in Table 5-1. The film was then run onto chilled rolls and wound up on rolls for further measurement and analysis. Films of 4.5 and 11 mil thickness (1 mil=1/1000 in) were obtained.

The films were exposed to e-beam radiation at E-Beam Services, Inc., Cranbury, N.J. The radiation doses were set to three different levels: 5, 10, and 20 MegaRad. The extent of crosslinking after radiation in the 11 mil thickness film was obtained by refluxing xylene extraction. Extent of crosslinking is determined by assuming that the all samples are 90% FPC and 10% SPC and that the SPC is not crosslinked and is thus extracted by the xylene regardless of the extent of crosslinking of the FPC. The extent of crosslinking is given in Table 5-2.

TABLE 5-1

| zone 1 temp (° F.) | 300 |
| zone 2 temp (° F.) | 370 |
| zone 3 temp (° F.) | 400 |
| adapter 1 temp (° F.) | 410 |
| adapter 2 temp (° F.) | 410 |
| die/feedblock temp (° F.) | 420 |
| melt temp (° F.) | 400 |

TABLE 5-1-continued

| extruder speed (rpm) | 90 |
| chill roll temp (° F.) | 60 |

TABLE 5-2

| Radiation dose (MegaRad) | weight of sample (g) | weight of residue after extraction (g) | insoluble FPC (%) |
|---|---|---|---|
| 5 | 1.55 | 0.6812 | 48.8 |
| 10 | 1.66 | 0.863 | 57.8 |
| 20 | 1.48 | 1.070 | 80.3 |

All patents, test procedures, and other documents cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the invention, including all features which would be treated as equivalents thereof by those skilled in the art to which the invention pertains.

When numerical lower limits and numerical upper limits are listed herein, ranges from any lower limit to any upper limit are contemplated.

What is claimed is:

1. A fabric comprising:
at least 60 wt %, based on the total polymeric weight of the fabric, of an elastomer having an isotactic propylene triad tacticity of from 65 to 95%, a melting point by DSC equal to or less than 110° C., a heat of fusion of from 5 to 50 J/g, and comprising:
  (a) propylene-derived units in an amount of at least 75 wt %, based on the combined weight of components (a), (b), and (c),
  (b) ethylene-derived units in an amount of at least 6 wt %, based on the combined weight of components (a), (b), and (c), and
  (c) diene-derived units in an amount of from 0.3 to 5 wt %, based on the combined weight of components (a), (b), and (c);
wherein the fabric further comprises a fluid curing system and is at least partially cured.

2. The fabric of claim 1, wherein the fluid curing system comprises peroxide.

3. A fabric comprising:
at least 60 wt %, based on the total polymeric weight of the fabric, of an elastomer having an isotactic propylene triad tacticity of from 65 to 95%, a melting point by DSC equal to or less than 110° C., a heat of fusion of from 5 to 50 J/g, and comprising:
  (a) propylene-derived units in an amount of at least 75 wt %, based on the combined weight of components (a), (b), and (c),
  (b) ethylene-derived units in an amount of at least 6 wt %, based on the combined weight of components (a), (b), and (c), and (c) diene-derived units in an amount of from 0.3 to 5 wt %, based on the combined weight of components (a), (b), and (c);

wherein the fabric is at least partially cured by radiation.

4. A film comprising:

at least 60 wt %, based on the total polymeric weight of the film, of an elastomer having an isotactic propylene triad tacticity of from 65 to 95%, a melting point by DSC equal to or less than 110° C., a heat of fusion of from 5 to 50 J/g, and comprising:

(a) propylene-derived units in an amount of at least 75 wt %, based on the combined weight of components (a), (b), and (c), (b) ethylene-derived units in an amount of at least 6 wt %, based on the combined weight of components (a), (b), and (c), and (c) diene-derived units in an amount of from 0.3 to 5 wt %, based on the combined weight of components (a), (b), and (c);

wherein the film is at least partially cured by radiation.

5. A film comprising:

at least 60 wt %, based on the total polymeric weight of the film, of an elastomer having an isotactic propylene triad tacticity of from 65 to 95%, a melting point by DSC equal to or less than 110° C., a heat of fusion of from 5 to 50 J/g, and comprising:

(a) propylene-derived units in an amount of at least 75 wt %, based on the combined weight of components (a), (b), and (c), (b) ethylene-derived units in an amount of at least 6 wt %, based on the combined weight of components (a), (b), and (c), and (c) diene-derived units in an amount of from 0.3 to 5 wt %, based on the combined weight of components (a), (b), and (c);

wherein the film further comprises a fluid curing system and is at least partially cured.

6. The film of claim 5, wherein the fluid curing system comprises peroxide.

7. The fabric of claim 1, wherein the diene comprises 5-ethylidene-2-norbornene (ENB) or 5-vinyl-2-norbornene (VNB).

8. The fabric of claim 3, wherein the diene comprises 5-ethylidene-2-norbornene (ENB) or 5-vinyl-2-norbornene (VNB).

9. The film of claim 4, wherein the diene comprises 5-ethylidene-2-norbornene (ENB) or 5-vinyl-2-norbornene (VNB).

10. The film of claim 5, wherein the diene comprises 5-ethylidene-2-norbornene (ENB) or 5-vinyl-2-norbornene (VNB).

11. The fabric of claim 1, wherein the diene-derived unit is selected from the group consisting of 5-ethylidene-2-norbornene (ENB), 5-vinyl-2-norbornene (VNB), divinyl benzene (DVB), and dicyclopentadiene (DCPD).

12. The fabric of claim 3, wherein the diene-derived unit is selected from the group consisting of 5-ethylidene-2-norbornene (ENB), 5-vinyl-2-norbornene (VNB), divinyl benzene (DVB), and dicyclopentadiene (DCPD).

13. The film of claim 4, wherein the diene-derived unit is selected from the group consisting of 5-ethylidene-2-norbornene (ENB), 5-vinyl-2-norbornene (VNB), divinyl benzene (DVB), and dicyclopentadiene (DCPD).

14. The film of claim 5, wherein the diene-derived unit is selected from the group consisting of 5-ethylidene-2-norbornene (ENB), 5-vinyl-2-norbornene (VNB), divinyl benzene (DVB), and dicyclopentadiene (DCPD).

* * * * *